(12) United States Patent
Yang et al.

(10) Patent No.: US 9,166,652 B2
(45) Date of Patent: Oct. 20, 2015

(54) NEAR FIELD COUPLING SOLUTIONS FOR WI-FI BASED WIRELESS DOCKING

(75) Inventors: Songnan Yang, San Jose, CA (US);
Ulun Karacaoglu, San Diego, CA (US);
Xintian E. Lin, Mountain View, CA (US); Bin Xiao, San Ramon, CA (US);
Narjala Bhasker, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 242 days.

(21) Appl. No.: 13/603,677

(22) Filed: Sep. 5, 2012

(65) Prior Publication Data

US 2014/0065956 A1 Mar. 6, 2014

(51) Int. Cl.
*H04B 7/00* (2006.01)
*H04B 1/38* (2015.01)
*H04B 5/00* (2006.01)

(52) U.S. Cl.
CPC ............ *H04B 5/0025* (2013.01); *H04B 5/0012* (2013.01); *H04B 5/0037* (2013.01); *H04B 5/0075* (2013.01)

(58) Field of Classification Search
USPC ........ 455/556.1, 556.2, 557, 41.1, 41.2, 41.3; 370/338
See application file for complete search history.

(56) References Cited

U.S. PATENT DOCUMENTS

| 2006/0159158 | A1* | 7/2006 | Moore et al. .................. 375/130 |
| 2012/0081213 | A1 | 4/2012 | Rosenblatt |
| 2012/0099566 | A1* | 4/2012 | Laine et al. ................... 370/338 |
| 2012/0171951 | A1* | 7/2012 | 't Hooft ....................... 455/41.1 |
| 2012/0180086 | A1 | 7/2012 | Yang |
| 2012/0282858 | A1* | 11/2012 | Gill et al. ..................... 455/41.1 |

FOREIGN PATENT DOCUMENTS

WO 2014/039133 A1 3/2014

OTHER PUBLICATIONS

International Search Report and Written Opinion received for PCT Application No. PCT/US2013/046475, mailed on Sep. 26, 2013, 9 pages.
International Preliminary Report on Patentability and Written Opinion received for PCT Patent Application No. PCT/US2013/046475, mailed on Mar. 19, 2015, 6 pages.

* cited by examiner

*Primary Examiner* — Nguyen Vo
(74) *Attorney, Agent, or Firm* — Forefront IP Lawgroup, PLLC

(57) ABSTRACT

Described herein are techniques related one or more systems, apparatuses, methods, etc. for a wireless fidelity (Wi-Fi) based wireless docking in an enterprise environment. In an implementation, a separate low radiating antenna is constructed and installed at a bottom surface of a wireless device and at a docking surface of a docking station. In this implementation, the low radiating antenna is configured to provide local wireless communication (i.e., Wi-Fi based communication) between a docking pair that includes the wireless device and the docking station.

8 Claims, 11 Drawing Sheets

NEAR FIELD COUPLING SOLUTIONS FOR WI-FI BASED WIRELESS DOCKING

BACKGROUND

A docking station may provide a simplified way of connecting peripherals such as a monitor, a keyboard or a mouse to a wireless device. Due to a wide range of wireless devices such as mobile phones, tablets, notebook computers etc. that may be docked with these peripherals through different types of connectors, power signaling, the use for these wireless devices may require to eliminate physical connectors between the wireless device and the peripherals.

Wireless docking is a key new feature in corporate environments where multiple docking pairs may be located in different areas/stations/cubicles that may be adjacent to one another. For example, a first cubicle may contain a first wireless device and a first docking station to connect multiple peripherals; a second adjacent cubicle may contain a second wireless device and a second docking station to connect with another separate peripherals; etc. In this example, a problem may arise when a wireless fidelity (Wi-Fi) signal is utilized to provide high speed wireless data link within these docking pairs. For example, the first docking pair may be able to detect the Wi-Fi signal at the adjacent second docking pair, which leads to bandwidth sharing according to IEEE 802.11 standard.

Accordingly, a solution allowing efficient docking operations between the docking pairs in the corporate environment is desired.

The following Detailed Description is provided with reference to the accompanying figures. In the figures, the left-most digit(s) of a reference number usually identifies the figure in which the reference number first appears. The use of the same reference numbers in different figures indicates similar or identical items.

DETAILED DESCRIPTION

This document discloses one or more systems, apparatuses, methods, etc. for a wireless fidelity (Wi-Fi) based wireless docking in an enterprise environment. In an implementation, a low radiating antenna is constructed and installed at a bottom surface, an edge, or a lid of a wireless device. In this implementation, the low radiating antenna is separate and distinct from an original Wi-Fi radio antenna that is optimized for far field radiation and used to connect the wireless device to a wireless access point. In an implementation, a dedicated network interface controller (NIC) is provided to the low radiating antenna for docking purposes. For example, the dedicated NIC and the low radiating antenna may use a different channel as compared to the channel used by the Wi-Fi radio antenna to connect the wireless device to the wireless access point. In other implementations, the NIC may be shared between the low radiating antenna and the Wi-Fi radio antenna. For example, a switch is installed to direct a connection of the NIC to either the Wi-Fi radio antenna or to the low radiating antenna.

In an implementation, another low radiating antenna may be separately constructed and installed in a docking surface of a docking station. In this implementation, the docking surface may include a planar surface for a laptop wireless device or a docking cradle shape for tablets or smart phone wireless devices. The docking surface may come in close proximity with the low radiating antenna installed at the wireless device and thereby produces a local docking operation between the docking pair. In other words, the low radiating antennas installed at the docking pair may be designed to provide a strong coupling at close proximity such as within a few millimeters of each other. In other implementations, this docking pair configuration may similarly be implemented to connect wireless display (WiDi) devices.

Figure 1A:
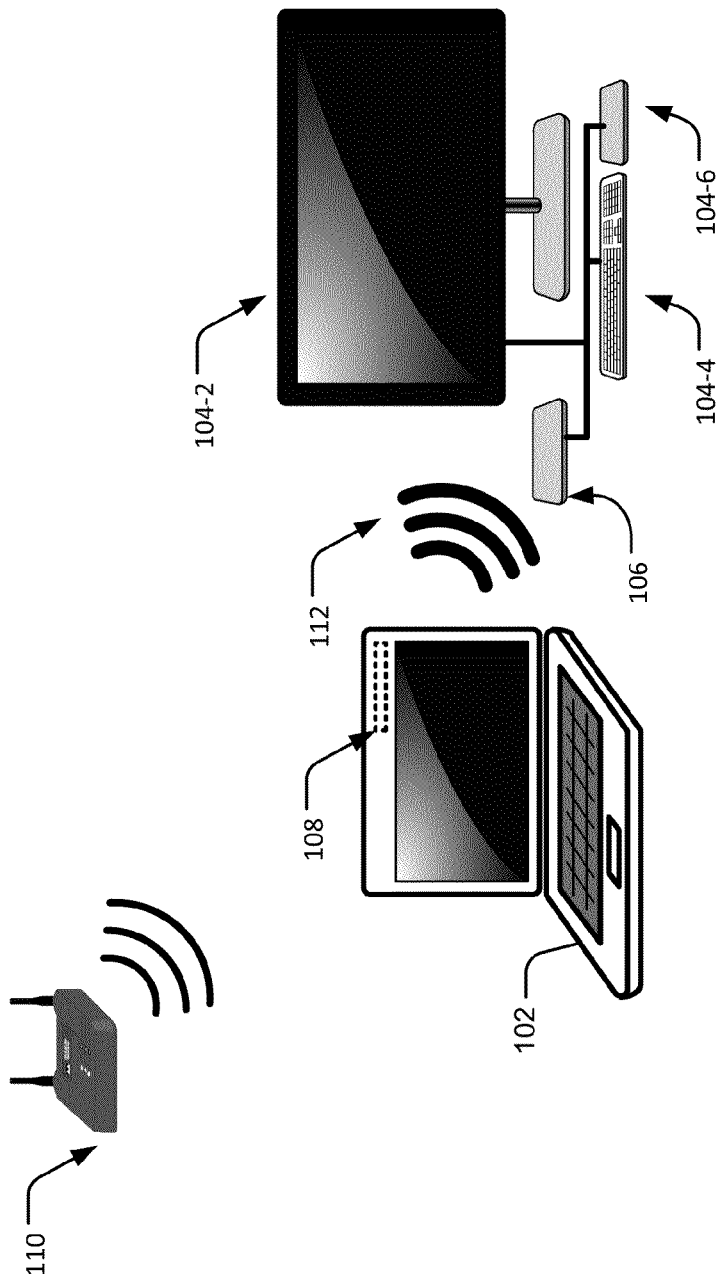
FIG. 1A illustrates an example arrangement for a wireless device associating with peripheral devices through a docking station.

FIG. 1A illustrates an example arrangement 100 for a wireless device associating with peripheral devices through a docking station. In an implementation, a wireless device 102 may connect with peripheral devices 104 such as, but are not limited to, a monitor 104-2, a keyboard 104-4, and a mouse 104-6 through a docking station 106. In this implementation, the docking station 106 may coordinate a connection setup such as a Wi-Fi based connection setup between the wireless device 102 and the peripheral devices 104. In an implementation, a user (not shown) may quickly associate the wireless device 102 with the docking station 106 and the connected peripheral devices 104 by placing the wireless device 102 within range of the docking station 106. In this implementation, the wireless device 102 may include a (Wi-Fi radio) antenna 108 to communicate with the docking station 106. The antenna 108 may be optimized for far field radiation and may reach a range that is beyond physical location of the docking station 106. For example, the antenna 108 may be utilized to maintain a strong connection with an access point (AP) 110 that may potentially be located far away from the wireless device 102 as compared to the physical location of the docking station 106. In other words, the antenna 108 capability may be more than enough to provide a wireless link 112 between the wireless device 102 and the docking station 106, which may be located very close to it. In other implementations, the docking station 106 may be the AP 110 or a Wi-Fi receiver device.

In an implementation, the wireless device 102 may include, but are not limited to, ultrabooks, a tablet computer, a netbook, a notebook computer, a laptop computer, mobile phone, a cellular phone, a smartphone, a personal digital assistant, a multimedia playback device, a digital music player, a digital video player, a navigational device, a digital camera, and the like. On the other hand, the peripheral devices 104 may include, but are not limited to, Input, Output, or Storage peripheral devices 104. The input peripheral device 104 may provide input to the wireless device 102 from the user (not shown) such as through the keyboard 104-4, mouse 104-6, etc. The output peripheral device 104 may provide output to the user (not shown) from the wireless device 102 such as through the monitor 104-2 or printer (not shown). A storage peripheral device 104 may store data (not shown) in between computing sessions such as through a hard drive (not shown) or flash drive (not shown).

Figure 1B:
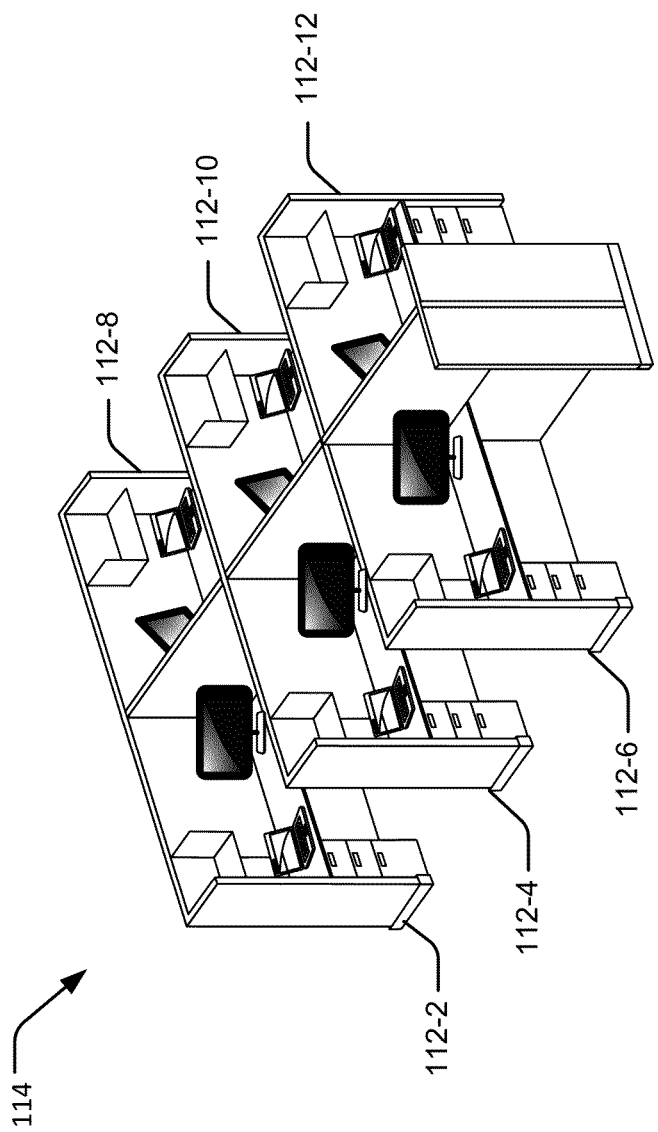
FIG. 1B illustrates wireless docking in an enterprise environment.

FIG. 1B illustrates wireless docking in an enterprise environment. As discussed above, the antenna 108 of the wireless device 102 may include the far field radiation even though the docking station 106, which is utilized to connect the peripheral devices 104 with the wireless device 102, is located nearby. In other words, transmitted power for the antenna 108 may include an effective area that may go beyond the distance between the wireless device 102 and the docking station 106.

With continuing reference to FIG. 1B, individual wireless devices 102-2, 102-4, ... and 102-12 may utilize corresponding docking stations 106-2, 106-4, ... and 106-12 at different areas or cubicles 112-2, 112-4, ... and 112-12, respectively. In this setup, a wireless communication in the cubicle 112-2 between the wireless device 102-2 and the docking station 106-2 may be heard by the other wireless devices 102-4, 102-6, ... and 102-12 that are located at the cubicles 112-4, 112-6, ... and 112-12, respectively. The reason being, the antenna 108 of the wireless device 102-2 may include an effective area 114 that may encompass the physical area covered by the rest of the cubicles 112. As a result, channel capacity (not shown) may be shared between the docking stations 106 traffic and regular Wi-Fi traffic within the coverage area 114. In other words, the sharing of medium access may significantly limit deployment of the Wi-Fi based docking station 106 in the enterprise environment.

Figure 2A:
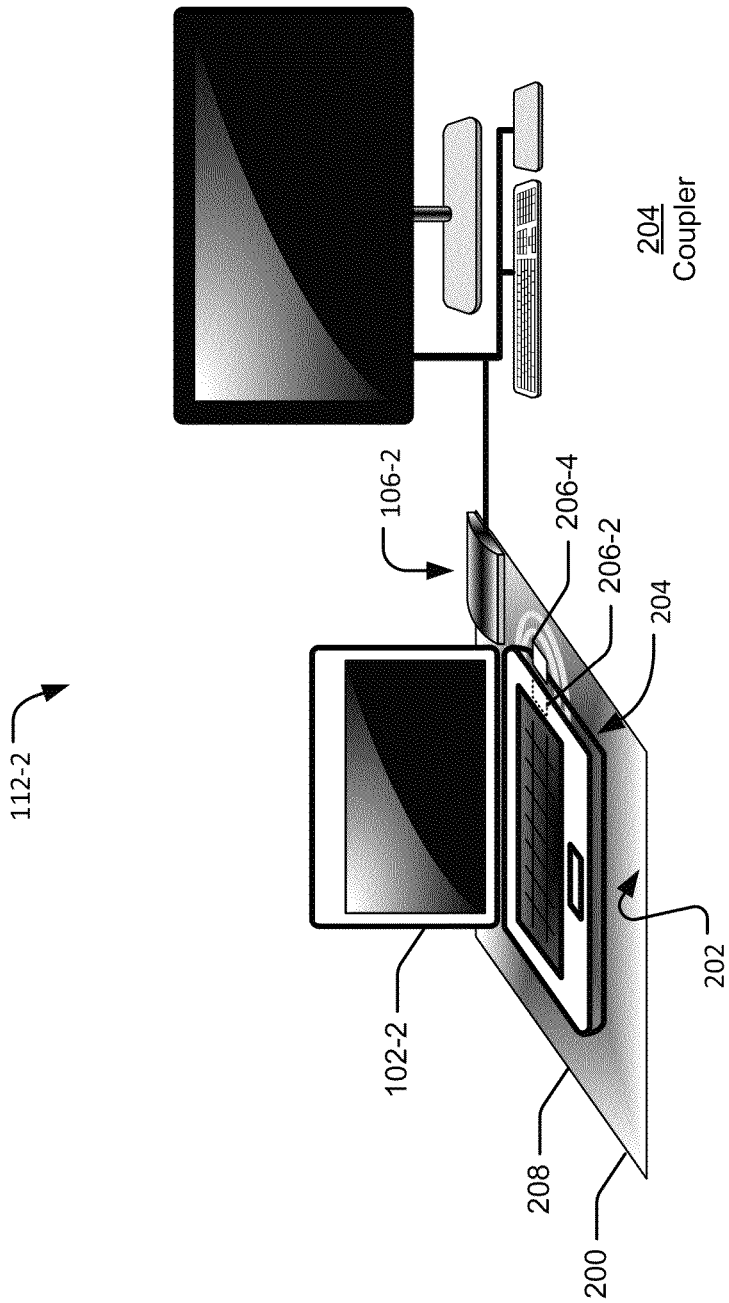
FIG. 2A illustrates an example implementation of a docking station to provide exclusive wireless communication between a docking pair.

FIG. 2A illustrates an example implementation of a docking station to provide local wireless communication between a docking pair. In an implementation, the docking station 106-2 may physically include or is connected to a docking surface 200. In this implementation, the docking surface 200 may be a planar surface for a laptop wireless device 102-2 or it may form a docking cradle shape for the tablet, mobile phone, etc. wireless devices 102. On a top surface 202 of the docking surface 200 as well as bottom 204 of the wireless device 102-2, a coupler or antenna 206 may be constructed and additionally installed to provide local wireless communications between the wireless device 102-2 and the docking station 106-2.

In an implementation, the antenna 206 may be configured or designed to include a minimal far field radiation while allowing low enough insertion loss through near field coupling between the wireless device 102-2 and the docking station 106-2. For example, the antenna 206-2 that may be installed at the top surface 202 of the docking surface 200 may be configured or designed to provide a small communication zone such as an area 208 that may be defined by outside perimeter of the docking surface 200. In this example, when the antenna 206-4 of the wireless device 102-2 comes close (e.g., few millimeters) or is in contact with the docking surface 200, the path loss (not shown) between the antennas 206-2 and 206-4 may become low enough to support local wireless communications between them. Since the antennas 206 are not designed to be efficient radiators, and the coupling between the antennas 206 are made through the bottom surface 204 of the wireless device 102-2, the wireless communications in the cubicle 112-2 may be kept local or concentrated between the docking pair (i.e., wireless device 102-2 and the docking station 106-2). Furthermore, neighboring docking pairs and even Wi-Fi connections at the cubicles 112-4, 112-6, ... and 112-12 may not be able to hear the docking traffic at the cubicle 112-2 when similar docking pair configurations are correspondingly applied to the rest of these cubicles.

Figure 2B:
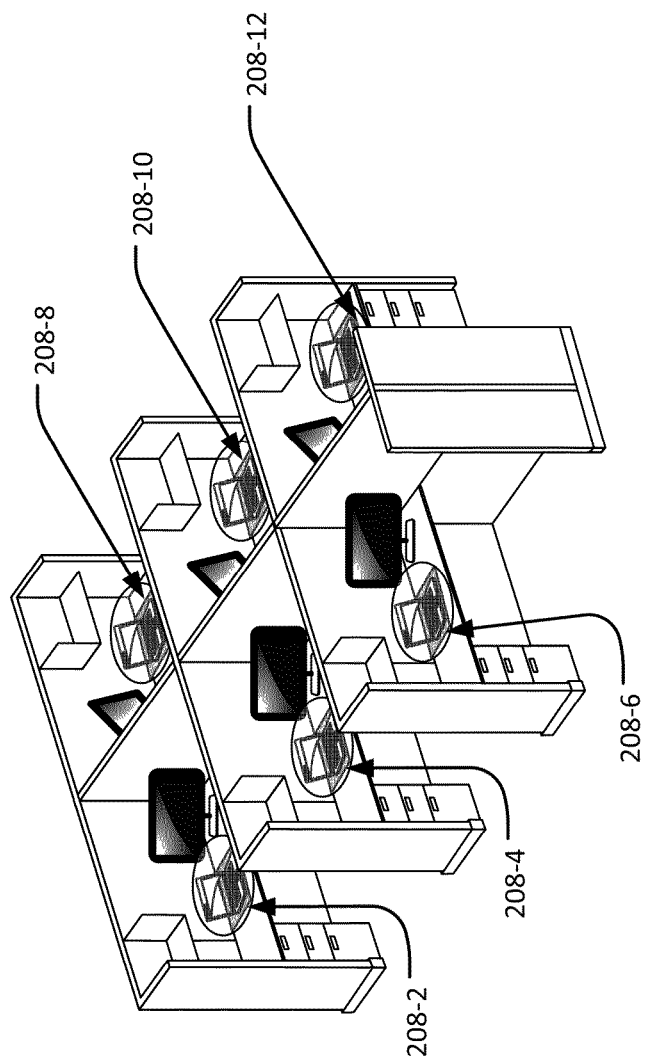
FIG. 2B illustrates an example wireless docking in an enterprise environment through utilization of an additional low radiating antenna.

FIG. 2B illustrates an example wireless docking in an enterprise environment with the use of the low radiating antenna 206. In an implementation, the docking pair configuration between the wireless device 102-2 and the docking station 106-2 - as discussed in FIG. 2A—may be implemented to the rest of the cubicles 112-4, 112-6, ... and 112-12, For example, the areas 208-4, 208-6, ... and 208-12 of the docking surfaces 200-4, 200-6, ... and 200-12, respectively, may individually define effective zone of wireless communications between the docking pairs in the cubicles 112-4, 112-6, ... and 112-12. The docking pairs may include the wireless device 102-4 and the docking station 106-4 at the cubicle 112-4, the wireless device 102-6 and the docking station 106-6 at the cubicle 112-6, etc. In this example, the local wireless communications between the docking pairs may utilize their own private channel (not shown) without sharing the channel capacity (not shown) with any other Wi-Fi traffic or another docking pair. In other words, the channel capacity (not shown) for each of the docking pair in the cubicles 112 is exclusive for their own data transmission to provide feasibility in the Wi-Fi based wireless docking at the enterprise environment.

Figure 3:
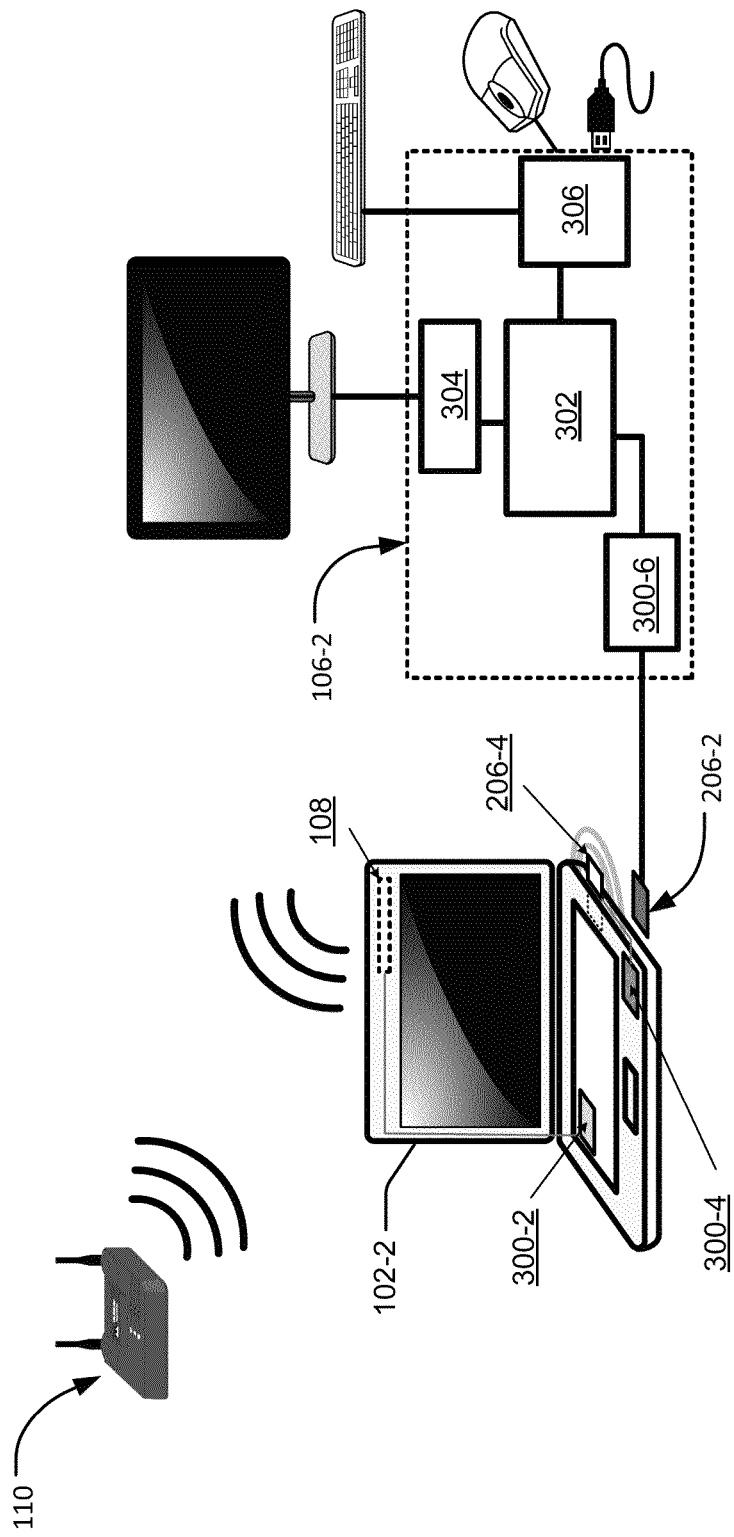
FIG. 3 illustrates an example implementation of a docking pair with a dedicated wireless fidelity (Wi-Fi) network interface controller (NIC).

FIG. 3 illustrates an example implementation of a docking pair with a dedicated Wi-Fi NIC. In an implementation, the installation of the low radiating antenna 206 may provide an additional Wi-Fi radio to the wireless device 102-2 for docking purposes only. The additional Wi-Fi radio is separate and distinct from an original Wi-Fi radio of the wireless device 102-2 that may include a NIC 300-2 and the antenna 108 to establish internet connection. The NIC 300-2 may include an electronic circuitry to allow the wireless device 102-2 to communicate over a computer network such as through the AP 110. In this implementation, the additional Wi-Fi radio may be configured to include a dedicated NIC 300-4 that is connected to the antenna 206-4 of the wireless device 102-2.

In an implementation, the additional Wi-Fi radio may communicate with the docking station 106-2 through a channel (not shown) that is different from the channel (not shown) used by the original Wi-Fi radio. In this implementation, different communication channels between the NICs 300-2 and 300-4 may provide best simultaneous operation performance in the docking pair.

With continuing reference to FIG. 3, the docking station 106-2 may include a dedicated NIC 300-6 to receive wireless docking traffic between the docking pair (i.e., wireless device 102-2 and docking station 106-2). In an implementation, the docking traffic received by the docking station 106-2 through the NIC 300-6 may be processed by an application processor 302. In this implementation, the application processor 302 may process the docking traffic and send data to display 304 and/or input/output (I/O) 306. In an implementation, the dedicated NIC 300-4 and the NIC 300-6 of the docking station 106-2 may be configured to feature a low transmission power and receiver sensitivity to make sure that their transmission may not interfere with neighboring Wi-Fi traffic or to be interfered by them.

Figure 4:
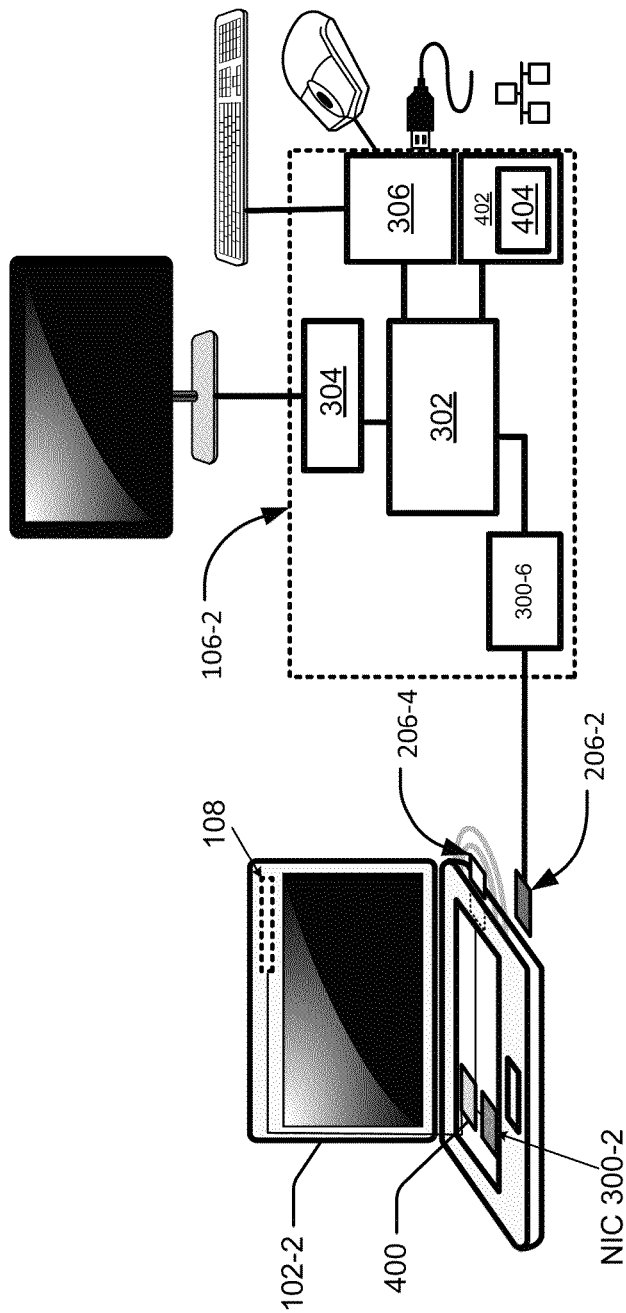
FIG. 4 illustrates an example implementation of a docking pair with a shared network interface controller (NIC).

FIG. 4 illustrates an example implementation of a docking pair sharing a NIC. In an implementation, the NIC 300-2 that is used in the original Wi-Fi radio of the wireless device 102-2 to connect with the computer network may be further configured and utilized for docking purposes. In this implementation, the NIC 300-2 may be shared by the antenna 108 of the original Wi-Fi radio and the low radiating antenna 206-4 of the additionally installed Wi-Fi radio for docking purposes. For example, at RF receiver stage (not shown) of the original Wi-Fi Radio, a switch 400 may be added to direct the NIC 300-2 connection to either the antenna 108 on top of lid, or to the antenna 206-4 at the bottom surface 204 of the wireless device 102-2. In an implementation, the switch 400 may be configured to connect with the antenna 206-4 when the wireless device 102-2 comes in close proximity (e.g., within the area 208) of the docking station 106-2. In this implementation, during the docking operation, the internet connectivity may be provided by the docking station 106-2 through an Ethernet/wireless component 402. For example, the Ethernet/wireless component 402 may include an additional Ethernet controller/wireless NIC 404 to provide the network connectivity when the wireless device 102-2 is docked. In this example, the channel (not shown) used by the NICs 300-6 and 404 may be different for best simultaneous operation performance.

In other implementations, the docking pair configuration described in FIG. 4 may be implemented on tablets and smart phones wireless devices 102-2 where proximity coupling based docking may be provided through either a bottom surface (not shown) of the tablet (not shown) or the edge (not shown) of the tablets or smart phones wireless devices 102-2. Similarly, the docking pair configuration may be implemented on convertible/detachable wireless devices 102 where the lid is detachable from a base to provide the wireless docking of the lid portion to the base. In an implementation, the docking pair configuration may be further combined with wireless charging solution to offer complete docking experience. In this implementation, the wireless charging solution includes, but is not limited to, conductive, capacitive and inductive charging. The wireless charging feature may also be used to trigger the switch 400.

Figure 5:
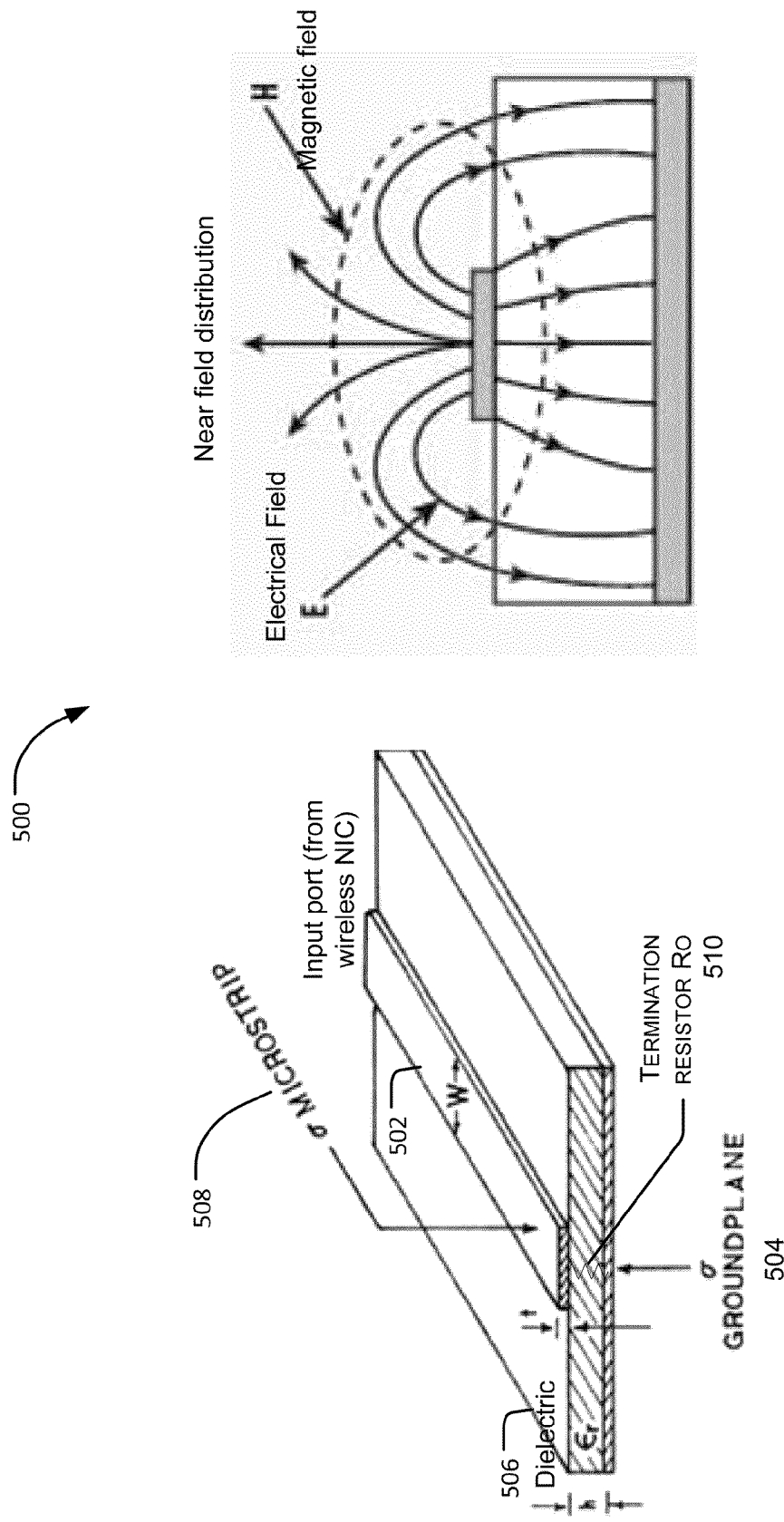
FIG. 5 illustrates an example configuration of a low radiating antenna for docking purposes.

FIG. 5 illustrates an example low radiating antenna 500 configuration for docking purposes. The antenna 500 may be constructed using a uniform metallic trace 502, a conductive ground plane 504, a dielectric substrate 506 and a matched load termination 510. The trace 502 is separated from the ground plane 504 by dielectric 506 forming a microstrip line configuration 508. The microstrip line structure 508 has defined characteristic impedance Zo. At the end of the transmission line, a termination resistor of resistance Ro 510 is connected between the trace 502 and ground plane 504. The resistance of the termination is very close to the characteristic impedance of the defined microstrip line 510 (if not the same) such that majority of the signal carried by the transmission line is absorbed by this termination. When a microwave signal (such as Wi-Fi signal is injected to this microstrip line antenna, it propagates in a Quasi-TEM mode along the transmission line towards the termination resistor. Along its way, a near field radiation is generated in the proximity of the surface of the metallic trace. This near field radiation is able to support a high coupling if a similar low radiating microstrip line antenna is brought in close (say approaching from the top). While it couples to a second low radiation microstrip antenna, the majority of the energy enters the antenna is absorbed by the termination resistor, such that the far field radiation of the antenna is low. Usually it can be designed such that a second low radiation antenna pair one meter away is not able to detect the Wi-Fi signal being transferred between this pair of low radiation antennas.

Figure 6:
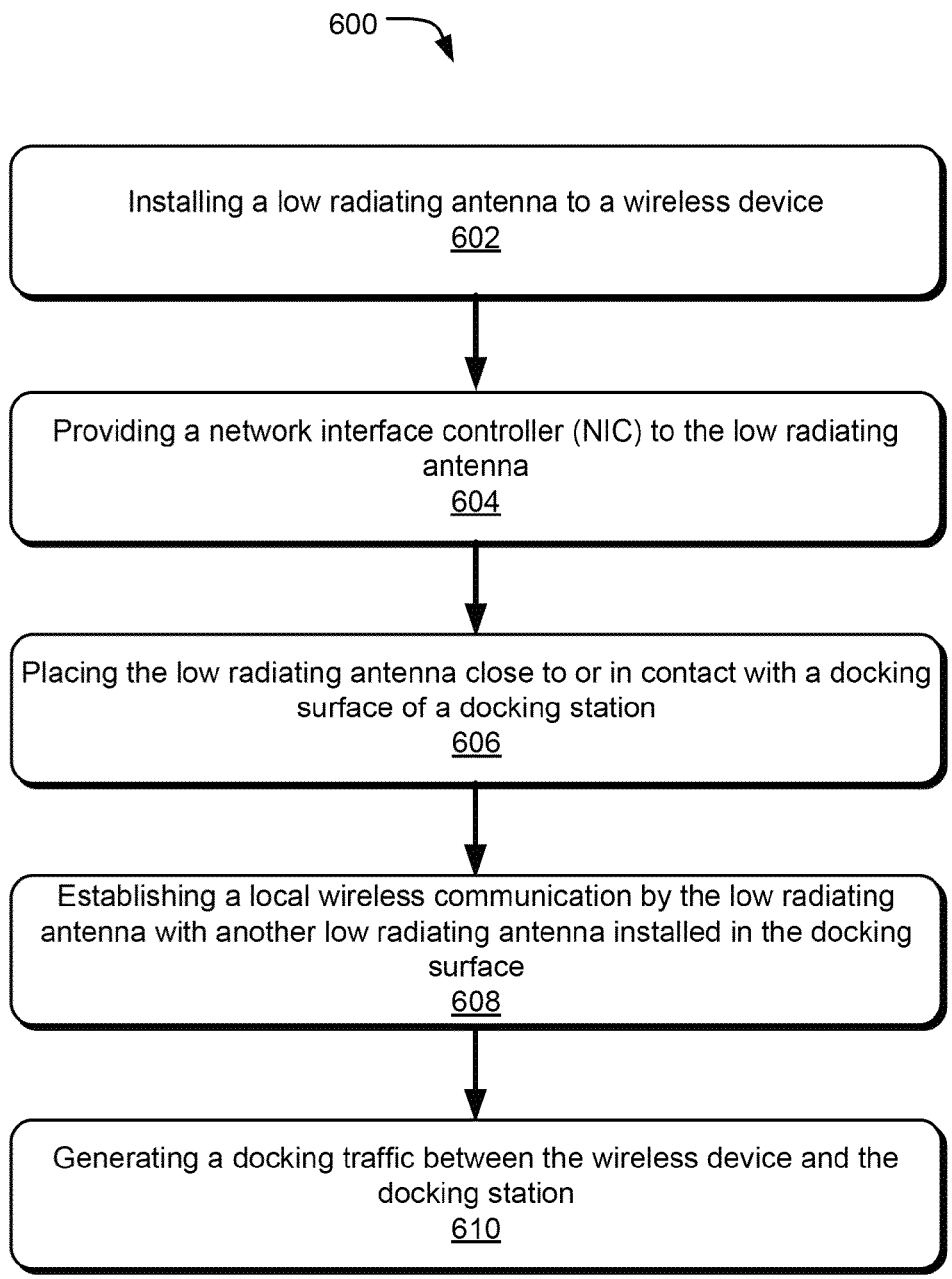
FIG. 6 illustrates an example process chart showing an example method for a wireless fidelity (Wi-Fi) based wireless docking at a wireless device side.

FIG. 6 shows an example process chart 600 illustrating an example method for a Wi-Fi based wireless docking at the wireless device side. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 602, installing a low radiating antenna to the wireless device is performed. In an implementation, the low radiating antenna (e.g., antenna 206-4) may be constructed to provide a strong coupling at a close distance or range e.g., few millimeters. In this implementation, the antenna 206-4 may emit a limited radiation pattern that is sufficient enough to allow local coupling between a docking pair (e.g., between a wireless device 102-2 and a docking station 106-2). In other words, the communication is essentially between the wireless device 102-2 and the docking station 106-2 only.

In an implementation, the antenna 206-4 may be installed at a bottom surface (e.g., bottom surface 204) of the wireless device 102-2. In other implementations such as in tablets or smartphone wireless devices 102-2, the antenna 206-4 may be installed at the bottom surface 204, at an edge, or at a dividing portion of the tablets or smartphone wireless devices 102-2.

At block 604, providing a NIC to the low radiating antenna is performed. In an implementation, a dedicated NIC (e.g., NIC 300-4) may be installed or connected to the antenna 206-4. The NIC 300-4 may setup wireless connections between the antenna 206-4 and another low radiating antenna (e.g., antenna 206-2 of the docking station 106-2) to establish the docking pair. In other implementations, a shared NIC (e.g., NIC 300-2) may be utilized by installing a switch (e.g., switch 400) to direct the NIC 300-2 connection to either the far field radiating antenna (e.g., antenna 108) or the low radiating antenna 206-4 that is used for docking purposes. In this implementation, the switch 400 may be triggered by the proximity of the antenna 206-4 to the antenna 206-2. Furthermore, the switch 400 may be triggered during detection of capacitive or inductive charging operations.

At block 606, placing the low radiating antenna close to or in contact with a docking surface of the docking station is performed. In an implementation, the antenna 206-4 may be placed within proximity range (e.g., within few millimeters of area 208) or in contact with the docking surface (e.g., docking surface 200) of the docking station 106-2 to produce the docking pair.

At block 608, establishing a local wireless communication by the low radiating antenna with the other low radiating antenna installed in the docking surface. In an implementation, the antenna 206-4 may establish the local wireless communication with the antenna 206-2 of the docking station 106-2. In this implementation, the local wireless communication may use a channel that is different from the channel used by a Wi-Fi radio antenna (e.g., antenna 108) in establishing Wi-Fi connection with an AP (e.g., AP 110).

At block 610, generating a docking traffic between the wireless device and the docking station is performed. In an implementation, the docking traffic (e.g., data transmission/reception) may be generated through the local wireless communication between the wireless device 102-2 and the docking station 106-2.

Figure 7:
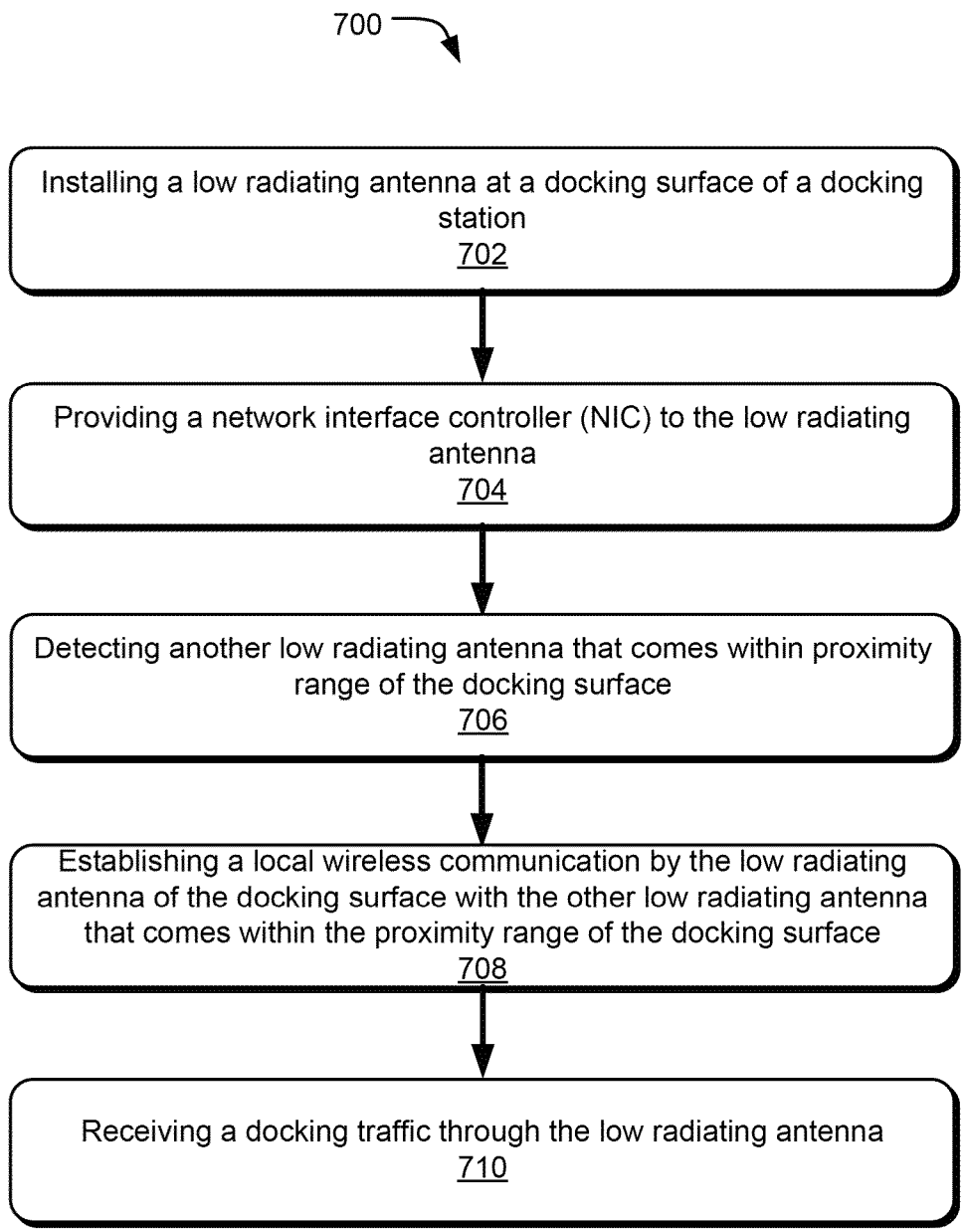
FIG. 7 illustrates an example process chart showing an example method for a wireless fidelity (Wi-Fi) based wireless docking at a docking station side.

FIG. 7 shows an example process chart 700 illustrating an example method for a Wi-Fi based wireless docking at the side of the docking station. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 702 installing a low radiating antenna at a docking surface of the docking station is performed. In an implementation, the low radiating antenna (e.g., antenna 206-2) may be constructed to provide a limited radiation pattern that is sufficient enough to allow local coupling between a docking pair that includes the wireless device 102-2 and the docking station 106-2. In this implementation, the antenna 206-2 may be installed at the docking surface (e.g., docking surface 200) of the docking station 106-2. For example, the docking surface 200 may be a planar surface for a laptop wireless device 102-2 or it may form a docking cradle shape for the tablet, mobile phone, etc. wireless devices 102.

At block 704, providing a NIC to the low radiating antenna is performed. In an implementation, the NIC (e.g., NIC 300-6) may be installed or connected to the antenna 206-2 to setup the connection in the docking pair. In other implementations where the shared NIC 300-2 is used at the wireless device 102-2, an additional Ethernet NIC (e.g., NIC 404) may be installed in the docking station 106 to setup the connection for connecting the wireless device 102-2 to a computer network. In this implementation, a separate channel may be used for docking purposes and the connection to the computer network.

At block 706, detecting another low radiating antenna that comes within proximity range of the docking surface is performed. In an implementation, the antenna 206-2 may detect another low radiating antenna (e.g., antenna 206-4 of the wireless device 102-2) that comes within proximity range (e.g., within few millimeters of area 208) or in contact with a docking surface (e.g., docking surface 200) of the docking station 106-2 to produce the docking pair.

At block 708, establishing a local wireless communication by the low radiating antenna of the docking surface with the other low radiating antenna that comes within the proximity range of the docking surface. In an implementation, the antenna 206-2 may establish the local wireless communication with the antenna 206-4 of the wireless device 102-2. In this implementation, the local wireless communication may use a channel that is different from the channel used by Wi-Fi radio antenna (e.g., antenna 108) of the wireless device 102-2 in establishing Wi-Fi connection with an AP (e.g., AP 110)

At block 710, receiving a docking traffic through the low radiating antenna is performed. In an implementation, the docking traffic may be received through the NIC 300-6 and further processed by an application processor (e.g., application processor 302) of the docking station 106-2.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

Figure 8:
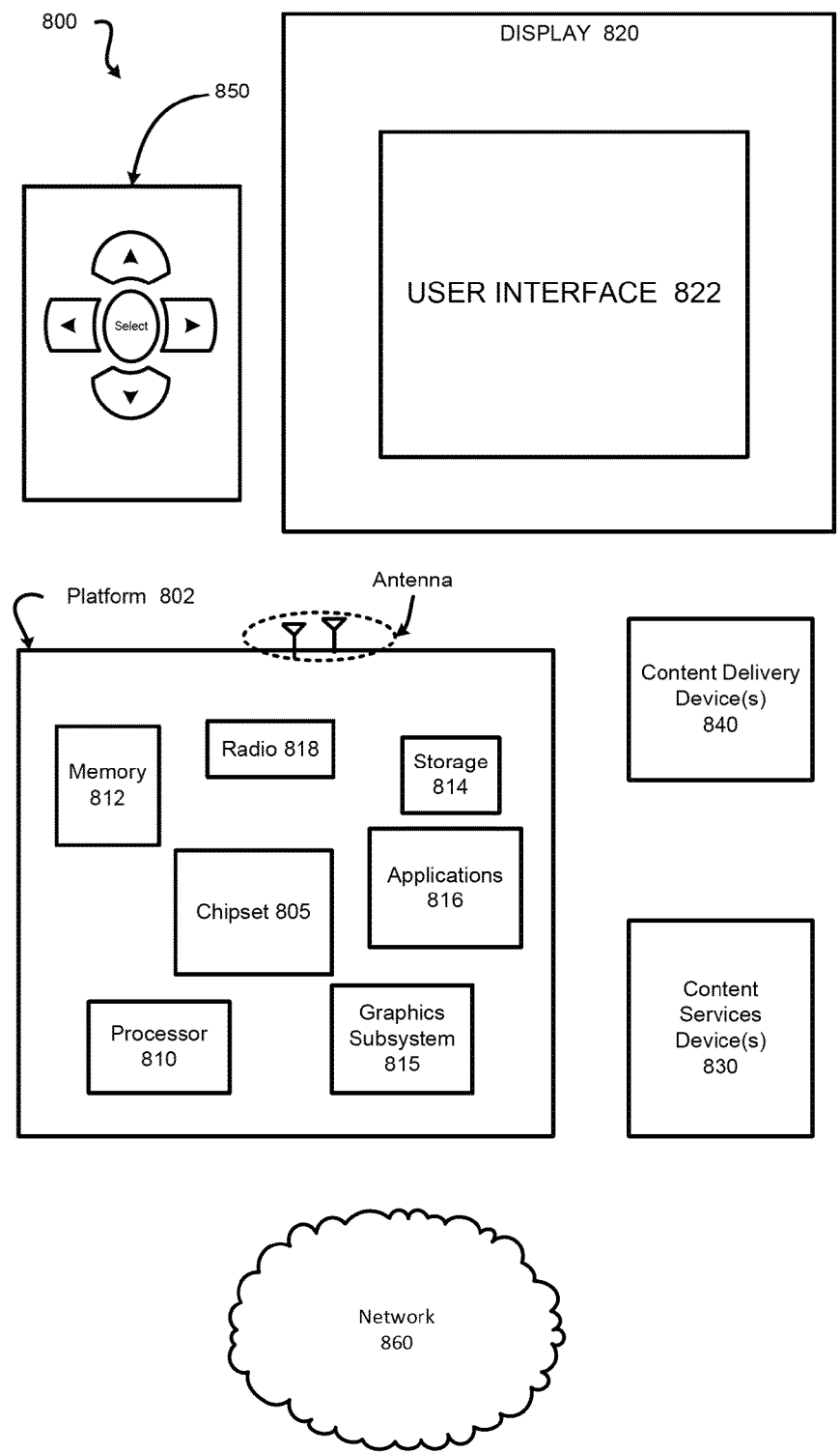
FIG. 8 illustrates an example system device to implement wireless docking operations in a docking pair.

FIG. 8 illustrates an example system 800 in accordance with the present disclosure. In various implementations, system 800 may be a media system although system 800 is not limited to this context. For example, system 800 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 800 includes a platform 802 coupled to a display 820. Platform 802 may receive content from a content device such as content services device(s) 830 or content delivery device(s) 840 or other similar content sources. A navigation controller 850 including one or more navigation features may be used to interact with, for example, platform 802 and/or display 820. Each of these components is described in greater detail below.

In various implementations, platform 802 may include any combination of a chipset 805, processor 810, memory 812, storage 814, graphics subsystem 815, applications 816 and/or radio 818. Chipset 805 may provide intercommunication among processor 810, memory 812, storage 814, graphics subsystem 815, applications 816 and/or radio 818. For example, chipset 805 may include a storage adapter (not depicted) capable of providing intercommunication with storage 814.

Processor 810 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 810 may be dual-core processor(s), dual-core mobile processor(s), and so forth.

Memory 812 may be implemented as a volatile memory device such as, but not limited to, a Random Access Memory (RAM), Dynamic Random Access Memory (DRAM), or Static RAM (SRAM).

Storage 814 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 814 may include technology to increase the storage performance enhanced protection for valuable digital media when multiple hard drives are included, for example.

Graphics subsystem 815 may perform processing of images such as still or video for display. Graphics subsystem 815 may be a graphics processing unit (GPU) or a visual processing unit (VPU), for example. An analog or digital interface may be used to communicatively couple graphics subsystem 815 and display 820. For example, the interface may be any of a High-Definition Multimedia Interface, Display Port, wireless HDMI, and/or wireless HD compliant techniques. Graphics subsystem 815 may be integrated into processor 810 or chipset 805. In some implementations, graphics subsystem 815 may be a stand-alone card communicatively coupled to chipset 805.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 818 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 818 may operate in accordance with one or more applicable standards in any version.

In various implementations, display 820 may include any television type monitor or display. Display 820 may include, for example, a computer display screen, touch screen display, video monitor, television-like device, and/or a television. Display 820 may be digital and/or analog. In various implementations, display 820 may be a holographic display. Also, display 820 may be a transparent surface that may receive a visual projection. Such projections may convey various forms of information, images, and/or objects. For example, such projections may be a visual overlay for a mobile augmented reality (MAR) application. Under the control of one or more software applications 816, platform 802 may display user interface 822 on display 820.

In various implementations, content services device(s) 830 may be hosted by any national, international and/or independent service and thus accessible to platform 802 via the Internet, for example. Content services device(s) 830 may be coupled to platform 802 and/or to display 820. Platform 802 and/or content services device(s) 830 may be coupled to a network 860 to communicate (e.g., send and/or receive) media information to and from network 860. Content delivery device(s) 840 also may be coupled to platform 802 and/or to display 820.

In various implementations, content services device(s) 830 may include a cable television box, personal computer, network, telephone, Internet enabled devices or appliance capable of delivering digital information and/or content, and any other similar device capable of unidirectionally or bidirectionally communicating content between content providers and platform 802 and/display 820, via network 860 or directly. It will be appreciated that the content may be communicated unidirectionally and/or bidirectionally to and from any one of the components in system 800 and a content provider via network 860. Examples of content may include any media information including, for example, video, music, medical and gaming information, and so forth.

Content services device(s) 830 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 802 may receive control signals from navigation controller 850 having one or more navigation features. The navigation features of controller 850 may be used to interact with user interface 822, for example. In embodiments, navigation controller 850 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 850 may be replicated on a display (e.g., display 820) by movements of a pointer, cursor, focus ring, or other visual indicators displayed on the display. For example, under the control of software applications 816, the navigation features located on navigation controller 850 may be mapped to virtual navigation features displayed on user interface 822, for example. In embodiments, controller 850 may not be a separate component but may be integrated into platform 802 and/or display 820. The present disclosure, however, is not limited to the elements or in the context shown or described herein.

In various implementations, drivers (not shown) may include technology to enable users to instantly turn on and off platform 802 like a television with the touch of a button after initial boot-up, when enabled, for example. Program logic may allow platform 802 to stream content to media adaptors or other content services device(s) 830 or content delivery device(s) 840 even when the platform is turned "off" In addition, chipset 805 may include hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 800 may be integrated. For example, platform 802 and content services device(s) 830 may be integrated, or platform 802 and content delivery device(s) 840 may be integrated, or platform 802, content services device(s) 830, and content delivery device(s) 840 may be integrated, for example. In various embodiments, platform 802 and display 820 may be an integrated unit. Display 820 and content service device(s) 830 may be integrated, or display 820 and content delivery device(s) 840 may be integrated, for example. These examples are not meant to limit the present disclosure.

In various embodiments, system 800 may be implemented as a wireless system, a wired system, or a combination of both. When implemented as a wireless system, system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 800 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 802 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 8.

As described above, system 800 may be embodied in varying physical styles or form factors. FIG. 8 illustrates implementations of a small form factor device 800 in which system 800 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computer, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

Figure 9:
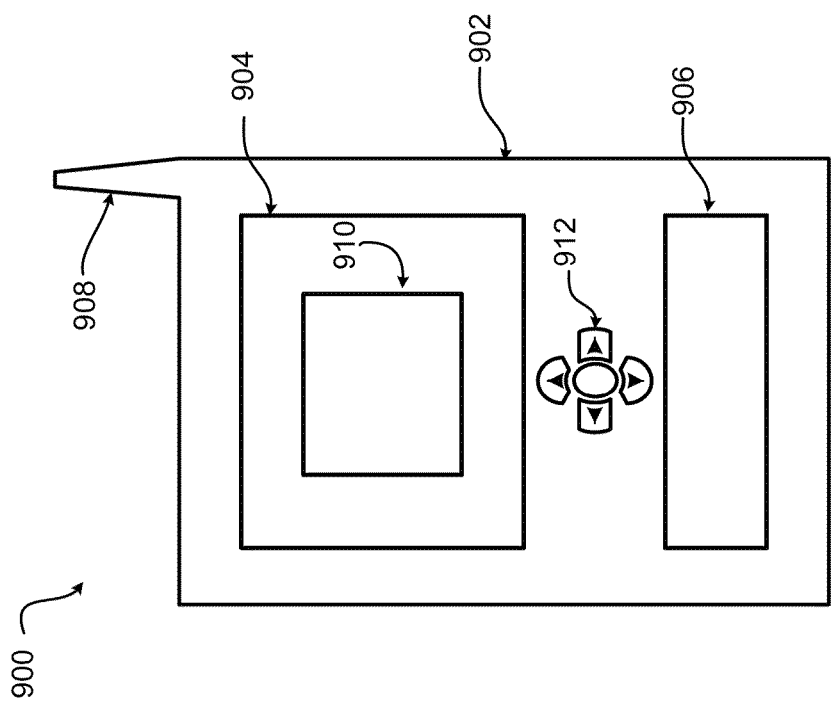
FIG. 9 illustrates an example device to implement wireless docking operations.

As shown in FIG. 9, device 900 may include a housing 902, a display 904, an input/output (I/O) device 906, and an antenna 908. Device 900 also may include navigation features 912. Display 904 may include any suitable display unit for displaying information appropriate for a mobile computing device. I/O device 906 may include any suitable I/O device for entering information into a mobile computing device. Examples for I/O device 906 may include an alphanumeric keyboard, a numeric keypad, a touch pad, input keys, buttons, switches, rocker switches, microphones, speakers, voice recognition device and software, and so forth. Information also may be entered into device 900 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

What is claimed is:

1. A wireless device comprising:
   one or more processors;
   a memory configured to the processors;

a wireless fidelity (Wi-Fi) radio antenna configured to the processors to establish a Wi-Fi connection between the wireless device and a computer network;

an antenna configured to the processors, the antenna is designed to include a limited radiation pattern and is integrated underneath a bottom surface of the wireless device for docking purposes;

a Wi-Fi network interface controller (NIC) connected to the antenna to setup connection for a docking pair; and a switch to direct connection of the Wi-Fi NIC that is shared by the Wi-Fi radio antenna installed in the wireless device and the antenna that is additionally installed for docking purposes, wherein the switch is triggered by proximity of the antenna to another antenna of a docking station.

2. The wireless device as recited in claim 1, wherein the Wi-Fi radio antenna uses a different channel from the antenna that is used for docking operations.

3. The wireless device as recited in claim 1, wherein the Wi-Fi radio antenna uses a separate Wi-Fi NIC from the Wi-Fi NIC that is connected to the antenna for docking purposes.

4. The wireless device as recited in claim 1, wherein the Wi-Fi NIC is shared between the Wi-Fi radio antenna that is originally installed in the wireless device and the antenna that is additionally installed for docking purposes.

5. The wireless device as recited in claim 1, wherein the antenna radiation pattern includes a maximum detection distance between docking pairs of one meter.

6. The wireless device as recited in claim 1, wherein the antenna is installed at an edge or at a dividing portion of tablets or smartphone wireless devices.

7. The wireless device as recited in claim 1, wherein the antenna is used to for a wireless charging implementation that includes one of conductive, capacitive inductive and magnetic resonance charging.

8. The wireless device as recited in claim 1 wherein a power signal that indicates whether the wireless device is powered by an external source is used to switch to docking or to switch between a radiation antenna and coupling antenna.

* * * * *